United States Patent
Bruneau

(10) Patent No.: US 10,187,198 B2
(45) Date of Patent: Jan. 22, 2019

(54) PROTECTION OF A RIJNDAEL ALGORITHM

(71) Applicant: STMicroelectronics (Rousset) SAS, Rousset (FR)

(72) Inventor: Nicolas Bruneau, Sainte Foy les Lyon (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 112 days.

(21) Appl. No.: 15/046,114

(22) Filed: Feb. 17, 2016

(65) Prior Publication Data

US 2017/0063524 A1  Mar. 2, 2017

(30) Foreign Application Priority Data

Sep. 2, 2015 (FR) .................................... 15 58114

(51) Int. Cl.
  *H04L 9/00* (2006.01)
  *G09C 1/00* (2006.01)
  *H04L 9/06* (2006.01)

(52) U.S. Cl.
  CPC ............. *H04L 9/005* (2013.01); *G09C 1/00* (2013.01); *H04L 9/003* (2013.01); *H04L 9/0631* (2013.01);
  (Continued)

(58) Field of Classification Search
  CPC ....... H04L 9/005; H04L 9/0618; H04L 9/003; H04L 2209/043; H04L 9/0631; H04L 2209/046; H04L 209/043; G09C 1/00
  See application file for complete search history.

(56) References Cited

U.S. PATENT DOCUMENTS 7,403,620 B2 * 7/2008 Liardet .................. H04L 9/003
  380/259
2003/0044003 A1 * 3/2003 Chari .................... G06F 21/556
  380/28

(Continued)

FOREIGN PATENT DOCUMENTS

WO  2012/146550 A1  11/2012

OTHER PUBLICATIONS

Bruneau et al., "Multi-Variate High-Order Attacks of Shuffled Tables Recomputation," *International Workshop on Cryptographic Hardware and Embedded Systems*, Springer Berlin Heidelberg, 2015, pp. 1-20.

Coron, "Higher Order Masking of Look-up Tables," *Annual International Conference on the Theory and Applications of Cryptographic Techniques*, Springer Berlin Heidelberg, 2014, 21 pages.

(Continued)

Primary Examiner — Joseph P Hirl
Assistant Examiner — J. Brant Murphy
(74) Attorney, Agent, or Firm — Seed IP Law Group LLP

(57) ABSTRACT

A method of protecting a Rijndael-type algorithm executed by an electronic circuit against side channel attacks, wherein: each block of data to be encrypted or decrypted is masked with a first mask before applying a non-linear block substitution operation from a first substitution box, and is then unmasked by a second mask after the substitution; the substitution box is recalculated, block by block, before applying the non-linear operation, the processing order of the blocks of the substitution box being submitted to a random permutation; and the recalculation of the substitution box uses the second mask as well as third and fourth masks, the sum of the third and fourth masks being equal to the first mask.

24 Claims, 6 Drawing Sheets

(52) U.S. Cl.
CPC .. *H04L 2209/043* (2013.01); *H04L 2209/046* (2013.01)

(56) References Cited

U.S. PATENT DOCUMENTS

| | | | |
|---|---|---|---|
| 2004/0028224 A1* | 2/2004 | Liardet | H04L 9/003 380/37 |
| 2004/0091107 A1* | 5/2004 | Fujisaki | H04L 9/003 380/42 |
| 2008/0253557 A1* | 10/2008 | Dottax | H04L 9/0631 380/28 |
| 2010/0086126 A1* | 4/2010 | Yokota | H04L 9/003 380/28 |
| 2010/0246808 A1* | 9/2010 | Hisakado | H04L 9/0618 380/1 |
| 2012/0250854 A1* | 10/2012 | Danger | H04L 9/003 380/28 |
| 2012/0257747 A1* | 10/2012 | Liardet | H04L 9/003 380/46 |
| 2014/0211937 A1 | 7/2014 | Coric et al. | |
| 2014/0351603 A1* | 11/2014 | Feix | H04L 9/003 713/189 |
| 2016/0105276 A1* | 4/2016 | Brumley | H04L 9/0618 380/28 |

OTHER PUBLICATIONS

Herbst et al., "An AES Smart Card Implementation Resistant to Power Analysis Attacks," *International Conference on Applied Cryptography and Network Security*, Springer Berlin Heidelberg, 2006, pp. 239-252.

Itoh et al., "DPA countermeasure Based on the "Masking Method"," *International Conference on Information Security and Cryptology*, Springer Berlin Heidelberg, 2001, pp. 440-456.

Federal Information Processing Standards Publication 197, "Announcing the Advanced Encryption Standard (AES)," Nov. 26, 20101, 51 pages.

Kocher et al., "Differential Power Analysis," *CRYPTO 99 Conference*, 1999, 10 pages.

U.S. Appl. No. 15/046,069, filed Feb. 17, 2016, DPA Protection of a Rijndael Algorithm.

U.S. Appl. No. 15/046,092, filed Feb. 17, 2016, Verification of the Resistance of an Electronic Circuit to Side-Channel Attacks.

"Advanced Encryption Standard," Wikipedia, retrieved from https://en.wikipedia.org/w/index.php?title=Advanced_Encryption_Standard &oldid=620143005 on Aug. 6, 2014, 10 pages.

Stack Exchange Network, "Prove XOR is commutative and associative," downloaded from http://math.stackexchange.com/questions/293793/prove-xor-is-commutative-and-associative on Jul. 2, 2018, 2 pages.

* cited by examiner

PROTECTION OF A RIJNDAEL ALGORITHM

BACKGROUND

Technical Field

The present disclosure generally relates to electronic circuits and, more particularly, to circuits executing encryption algorithms known as Rijndael algorithms, which implement a same transformation on different portions of data to be encrypted. The present disclosure more specifically relates to the protection of a calculation executed by such an algorithm against attacks by differential power analysis (DPA).

Description of the Related Art

In many applications, electronic circuits implement algorithms of encryption, verification, signature, and more generally algorithms manipulating data, called secret data, that is, the access to which is desired to be reserved to certain users or circuits. Among Rijndael algorithms, the AES algorithm, often called AES (Advanced Encryption Standard, FIPS PUB 197), processes data blocks having a size set to 128 bits and is a particularly common encryption algorithm.

The AES applies to a word or message divided into blocks a same transformation a plurality of times in a row based on different sub-keys originating from a same key.

There exist many methods, called attacks, to attempt discovering or to pirate secret data. Among such attacks, so-called side channel attacks comprise analyzing the influence of the calculation executed by the electronic circuit on parameters such as its power consumption, its electromagnetic radiation, etc. A particularly common side channel attack is the attack known as DPA (Differential Power Analysis). Such an attack comprises correlating the power consumption of the integrated circuit executing the algorithm with calculation results involving the secret keys used during the encryption or the decryption. In practice, based on a message to be encrypted and on assumptions relative to the secret key, a curve of statistic correlation over time between the circuit power consumption for the encryption of the message and an intermediate value calculated by the circuit is plotted. Such power analysis attacks are widely described in literature (see for example the article "Differential Power Analysis" by Paul Kocher, Joshua Jaffe, and Benjamin Jun, published in 1999, CRYPTO 99 Conference, pages 388 to 397, published by Springer-Verlag LNCS 1666).

BRIEF SUMMARY

An embodiment may facilitate overcoming all or part of the disadvantages of usual methods and circuits of protection against side channel attacks.

An embodiment provides a method of calculating an AES algorithm which may facilitate overcoming all or part of the disadvantages of usual methods.

An embodiment provides a method of verifying the sensitivity of an electronic circuit executing an AES algorithm to a side channel attack.

An embodiment provides a method of protecting a Rijndael-type algorithm executed by an electronic circuit against side channel attacks, wherein:

each block of data to be encrypted or decrypted is masked with a first mask before applying a non-linear block substitution operation based on a first substitution box, and is then unmasked with a second mask after the substitution;

the substitution box is recalculated, block by block, before applying the non-linear operation, the order of the processing of the blocks of the substitution box being submitted to a random permutation; and the recalculation of the substitution box uses the second mask as well as third and fourth masks, the sum of the third and fourth masks being equal to the first mask.

According to an embodiment:

successively for each block in the first box:

the rank of the current block is submitted to said permutation and the result is combined with the third mask;

the current block of a second box is replaced with the combination of the second mask with the block of the first box identified by the result of the permutation; and successively for each block in the second box:

the rank of the current block is submitted to said permutation and the result is combined with the fourth mask;

the current block of the first box is replaced with the block of the second box identified by the result of the permutation.

According to an embodiment, the method comprises the steps of:

successively for each block in the first box:

in a first step, applying the permutation to the rank of the current block, combining the result with the first mask and storing the result in a first variable;

in a second step, storing in a second variable the result of the combination of the second mask with the block of the first box having as a rank the result of the permutation applied to the rank of the current block; and storing the result of the second step in a block, identified by the result of the first step, of a second box;

successively for each block in the second box:

in a third step, applying the permutation to the rank of the current block, combining the result with the second mask and storing the result in the first variable;

in a fourth step, storing in the second variable the block of the second box having as a rank the result of the permutation applied to the current rank; and storing the result of the fourth step in a block, identified by the result of the third step, of the first box.

According to an embodiment, the first box forms the recalculated substitution box.

According to an embodiment:

the blocks of the first box are copied in a second box;

successively for each block in the second box:

the rank of the current block is submitted to said permutation and the result is combined with the third mask;

the current block of the first box is replaced with the combination of the second mask with the block of the second box identified by the result of the permutation; and successively for each block in the first box:

the rank of the current block is submitted to said permutation and the result is combined with the fourth mask;

the current block of the second box is replaced with the block of the first box identified by the result of the permutation.

According to an embodiment, the method comprises the steps of:

copying the blocks of the first box in a second box;

successively for each block in the second box:

in a first step, applying the permutation to the rank of the current block, combining the result with the first mask and storing the result in a first variable;

in a second step, storing in a second variable the result of the combination of the second mask with the block of the second box having as a rank the result of the permutation applied to the rank of the current block; and storing the result of the second step in a block of the first box, identified by the result of the first step;

successively for each block in the first box:

in a third step, applying the permutation to the rank of the current block, combining the result with the second mask, and storing the result in the first variable;

in a fourth step, storing in the second variable the block of the first box having as a rank the result of the permutation applied to the current rank; and storing the result of the fourth step in a block of the second box identified by the result of the third step.

According to an embodiment, the second box forms the recalculated substitution box.

According to an embodiment, the masks are random numbers.

According to an embodiment, the masks all have the same size as a block.

According to an embodiment, the combinations are of XOR type.

According to an embodiment, the method is applied to the AES.

An embodiment provides an electronic circuit, which, in operation, implements one or more of the methods disclosed herein.

The foregoing will be discussed in detail in the following non-limiting description of specific embodiments in connection with the accompanying drawings.

In an embodiment, a method comprises: protecting an electronic circuit against side channel attacks during processing of data by the electronic circuit, by: masking each block of data to be processed with a first mask; applying a non-linear block substitution operation based on a first substitution box to the masked data; and unmasking a result of the application of the non-linear block substitution operation with a second mask, wherein the substitution box is recalculated, block by block, before applying the non-linear substitution operation, an order of processing of the blocks of the substitution box is subjected to a random permutation, and the recalculation of the substitution box uses the second mask as well as third and fourth masks, a combination of the third and fourth masks being equal to the first mask. In an embodiment, the method comprises: successively for each block in the first substitution box: submitting a rank of a current block to said permutation and combining a result of the permutation of the rank of the current block with the third mask; and replacing the current block of a second box with a combination of the second mask with a block of the first box identified by the result of the permutation of the rank of the current block; and successively for each block in the second substitution box: submitting a rank of a current block to said permutation and combining a result of the permutation of the rank of the current block with the fourth mask; and replacing the current block of the first substitution box with a block of the second box identified by the result of the permutation of the rank of the current block. In an embodiment, the method comprises: successively for each block in the first box: in a first step, applying the permutation to a rank of a current block, combining a result of the permutation of the rank of the current block with the first mask, and storing a result of the combination in a first variable; in a second step, storing in a second variable a result of a combination of the second mask with a block of the first box having a rank of the result of the permutation applied to the rank of the current block; and storing the second variable in a block of a second box having a rank of the first variable; and successively for each block in the second box: in a third step, applying the permutation to a rank of a current block, combining a result of the permutation of the rank of the current block with the second mask, and storing a result of the combination in the first variable; in a fourth step, storing in the second variable the block of the second box having a rank of the result of the permutation applied to the rank of the current block; and storing the second variable in a block of the first box having a rank of the first variable. In an embodiment, the first box is the recalculated substitution box. In an embodiment, the method comprises: copying the blocks of the first box into a second box; successively for each block in the second box: submitting a rank of a current block to said permutation and combining a result of the permutation of the rank with the third mask; and replacing the current block of the first box with a combination of the second mask and a block of the second box identified by the result of the permutation of the rank; and successively for each block in the first box: submitting a rank of a current block to said permutation and combining a result of the permutation of the rank with the fourth mask; and replacing the current block of the second box with a block of the first box having a rank of the result of the permutation of the rank of the current block. In an embodiment, the method comprises: copying the blocks of the first box into a second box; successively for each block in the second box: in a first step, applying the permutation to a rank of a current block, combining a result of the permutation of the rank with the first mask, and storing the combination in a first variable; in a second step, storing in a second variable a result of a combination of the second mask with a block of the second box having a rank of the result of the permutation of the rank of the current block; and storing the second variable in a block of the first box having a rank of the first variable; and successively for each block in the first box: in a third step, applying the permutation to a rank of a current block, combining a result of the permutation of the rank with the second mask, and storing the combination in the first variable; in a fourth step, storing in the second variable a block of the first box having a rank of the result of the permutation of the current rank; and storing the second variable in a block of the second box having a rank of the first variable. In an embodiment, the second box is the recalculated substitution box. In an embodiment, the masks are random numbers. In an embodiment, the masks have a same size as a block. In an embodiment, the combinations are of XOR type. In an embodiment, the processing comprises applying an Advanced Encryption Standard (AES) algorithm. In an embodiment, the processing comprises applying a Rijndael-type algorithm to the data.

In an embodiment, an apparatus comprises: one or more registers; and circuitry coupled to the one or more registers, the circuitry, in operation, protecting the apparatus against side channel attacks during processing of data by the apparatus, by: masking each block of data to be processed with a first mask; applying a non-linear block substitution operation based on a first substitution box to the masked data; and unmasking a result of the application of the non-linear block substitution operation with a second mask, wherein the substitution box is recalculated, block by block, before applying the non-linear substitution operation, an order of processing of the blocks of the substitution box is subjected to a random permutation, and the recalculation of the substitution box uses the second mask as well as third and fourth masks, a combination of the third and fourth masks being equal to the first mask. In an embodiment, the protecting the apparatus against side channel attacks includes: successively for each block in the first substitution box: submitting a rank of a current block to said permutation and combining a result of the permutation of the rank of the current block with the third mask; and replacing the current block of a second box with a combination of the second mask with a block of the first box identified by the result of the permutation of the rank of the current block; and successively for each block in the second substitution box: submitting the rank of a current block to said permutation and combining a result of the permutation of the rank of the current block with the fourth mask; and replacing the current block of the first box with a block of the second box identified by a result of the permutation of the rank of the current block. In an embodiment, the protecting the apparatus from side channel attacks includes: successively for each block in the first box: applying the permutation to a rank of a current block, combining a result of the permutation of the rank of the current block with the first mask, and storing a result of the combination in the one or more registers as a value of a first variable; storing a result of a combination of the second mask with a block of the first box having a rank of the result of the permutation applied to the rank of the current block in the one or more registers as a value of a second variable; and storing the value of the second variable in a block of a second box having a rank of the value of the first variable; and successively for each block in the second box: applying the permutation to a rank of a current block, combining a result of the permutation of the rank of the current block with the second mask, and storing a result of the combination in the one or more registers as the value of the first variable; storing the block of the second box having a rank of the result of the permutation applied to the rank of the current block in the one or more registers as the value of the second variable; and storing the value of the second variable in a block of the first box having a rank of the value of the first variable. In an embodiment, the recalculated substitution box is the first box. In an embodiment, the protecting the apparatus from side channel attacks includes: copying the blocks of the first box into a second box; successively for each block in the second box: submitting a rank of a current block to said permutation and combining a result of the permutation of the rank with the third mask; and replacing the current block of the first box with a combination of the second mask and a block of the second box identified by the result of the permutation of the rank; and successively for each block in the first box: submitting a rank of a current block to said permutation and combining a result of the permutation of the rank with the fourth mask; and replacing the current block of the second box with a block of the first box having a rank of the result of the permutation of the rank of the current block. In an embodiment, the protecting the apparatus from side-channel attacks includes: copying the blocks of the first box into a second box; successively for each block in the second box: applying the permutation to a rank of a current block, combining a result of the permutation of the rank with the first mask, and storing the combination in the one or more registers as a value of a first variable; storing a result of a combination of the second mask with a block of the second box having a rank of the result of the permutation of the rank of the current block in the one or more registers as a value of a second variable; and storing the value of the second variable in a block of the first box having a rank of a value of the first variable; and successively for each block in the first box: applying the permutation to a rank of a current block, combining a result of the permutation of the rank with the second mask, and storing the combination in the one or more registers as the value of the first variable; storing a block of the first box having a rank of the result of the permutation of the current rank in the one or more registers as the value of the second variable; and storing the value of the second variable in a block of the second box having a rank of the value of the first variable. In an embodiment, the second box is the recalculated substitution box. In an embodiment, the masks are random numbers having a same size as a block and the combinations are of an XOR type. In an embodiment, the apparatus comprises an integrated circuit including the circuitry and the one or more registers.

In an embodiment, a system comprises: a bus system; and circuitry, coupled to the bus system, the circuitry, in operation, protecting against side channel attacks by: masking each block of data to be processed with a first mask; applying a non-linear block substitution operation based on a first substitution box to the masked data; and unmasking a result of the application of the non-linear block substitution operation with a second mask, wherein the substitution box is recalculated, block by block, before applying the non-linear substitution operation, an order of processing of the blocks of the substitution box is subjected to a random permutation, and the recalculation of the substitution box is based on the second mask, a third and a fourth masks, a combination of the third and fourth masks being equal to the first mask. In an embodiment, the system comprises an integrated circuit including the circuitry. In an embodiment, the integrated circuit comprises a plurality of registers and the protecting against side channel attacks includes storing variables in the plurality of registers.

DETAILED DESCRIPTION

Figure 1:
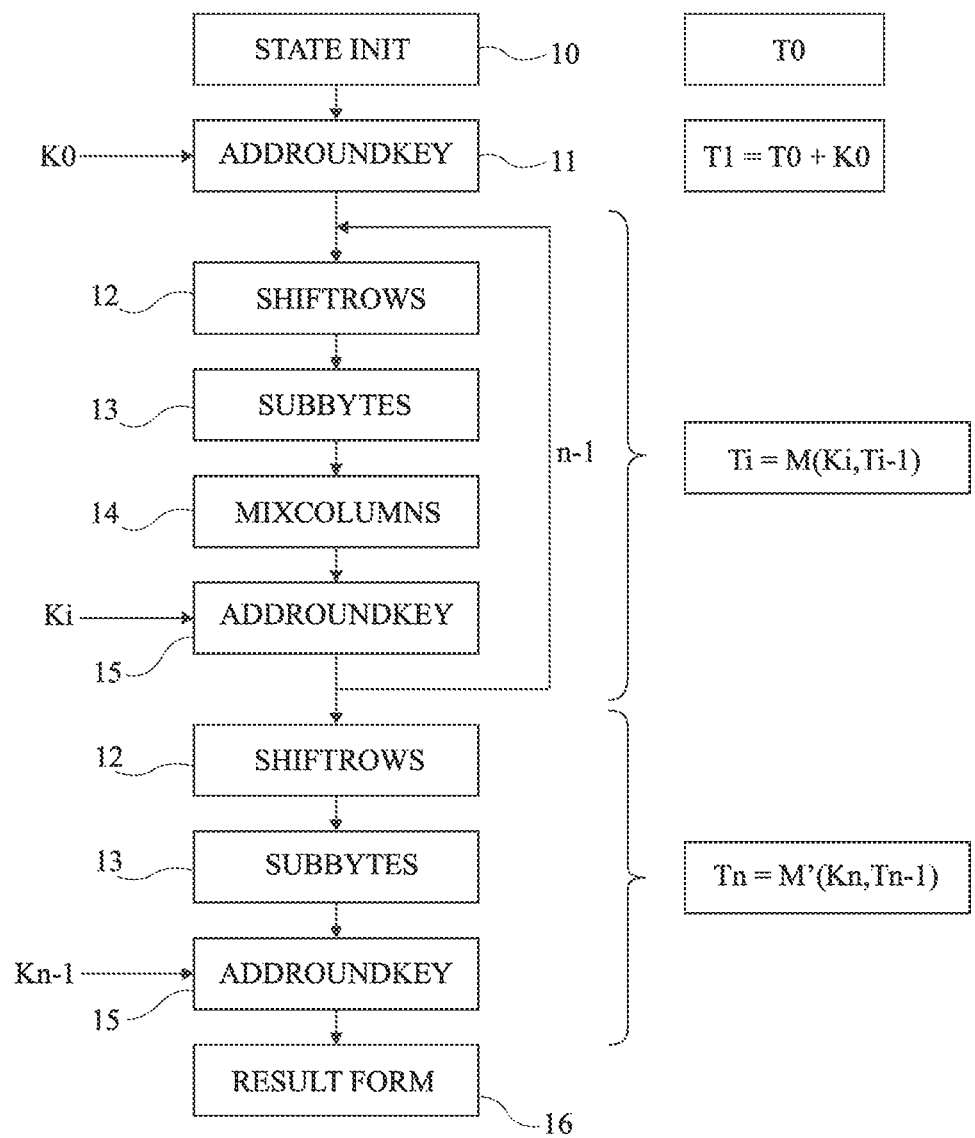
FIG. 1 illustrates in a simplified diagram of an AES-type algorithm.

The same elements have been designated with the same reference numerals in the different drawings unless the context indicates otherwise. In particular, the structural and/or functional elements common to the different embodiments may be designated with the same reference numerals and may have identical structural, dimensional, and material properties. For clarity, only those steps and elements which are useful to the understanding of the described embodiments have been shown and will be detailed. In particular, the applications of the executed encryptions/decryptions or of the electronic circuits executing them have not been detailed, the described embodiments being compatible with usual applications.

The embodiments will be described hereafter in relation with an example of application to the AES. However, all that is described hereafter more generally applies to any block algorithm involving a non-linear substitution operation, such as Rijndael-type algorithms.

The AES is generally executed by integrated circuits, either by means of wired logic state machines, or by means of microprocessors executing a program in a memory (generally, a ROM). The algorithm uses secret keys specific to the integrated circuit or to the user, which are processed to encrypt the data. For example, the AES applies, to a word or data code divided into blocks, a same transformation a plurality of times in a row based on different encryption sub-keys (portions of a binary word forming a key).

The AES is often used in electronic devices of microcircuit card, decoder, cell phone, or other type.

FIG. 1 illustrates in a simplified diagram an AES-type algorithm. Only the encryption will be described, the decryption involving the reverse transformations. For more details, reference can be made to work "The Design of Rijndael" of Joan Daemen and Vincent Rijmen, Springer-Verlag Eds (ISBN 3-540-42580-2) and to the AES standard (FIPS PUB 197).

This algorithm encrypts a word or code T0 of a determined number of bits into another word or code Tn of same size. The data (message) to be processed are divided into a plurality of words or codes all having the same size (128 bits for the AES). The encryption and the decryption rely on a secret key having its length (128, 192, or 256 bits for the AES) conditioning the encryption security.

In practice, each step of the AES processes an array of four rows and four columns, representing a word, each element thereof being a byte or block of the processed 128-bit code. To simplify the following description, reference will be made, for each step, to a state considered as being an array. An AES algorithm applied to 32-bit words divided into bytes, which corresponds to the most frequent case, is taken as an example.

It is started by generating, based on the secret key over 128, 192, or 256 bits, respectively 11, 13, or 15 sub-keys each also comprising 128 bits. These sub-keys are intended to be used by the algorithm described in relation with FIG. 1.

It is started from an initial state T0 (block 10, STATE INIT) of the code or data word to be encrypted.

A first phase of the AES is an operation (block 11, ADDROUNDKEY) which comprises performing an XOR-type combination, noted + in the drawings, of initial state T0 with first sub-key K0. A first intermediate state T1 is obtained. In practice, the operations are performed byte by byte.

A second phase comprises performing a plurality of rounds or cycles of a same transformation M involving, for each round i, state Ti−1 obtained at the previous round and a current sub-key Ki. The number of rounds of transformation M corresponds to n−1, that is, to number n+1 of derived sub-keys, decreased by 2. Each round transformation M is formed of four successively-applied operations.

A first operation (block 12, SHIFTROWS) comprises performing a rotation on the last three rows of the array. Typically, the first row of the array remains unchanged, the second row is rotated by one byte, the third row is rotated by two bytes, and the fourth row is rotated by three bytes.

A second operation (block 13, SUBBYTES) of round transformation M is a non-linear transformation where each byte of the array forming the current state is replaced with its image, taken from a substitution box, generally called SBOX. This substitution box may be obtained by two combined transformations. A first transformation comprises reversing the considered byte (the element of the array) in the finite body of order $2^8$ (to correspond to the byte), byte 00 forming its own image. This reversal is followed by an affine transformation.

A third operation (block 14, MIXCOLUMNS) of round transformation M comprises considering each column of the array resulting from the previous step as a polynomial on the finite body of order $2^8$, and multiplying each of these polynomials by a polynomial of combination modulo another polynomial.

A fourth and last operation (block 15, ADDROUNDKEY) of round transformation M of rank i comprises applying sub-key Ki to the array resulting from the previous state to obtain an array where each byte of the array resulting from the previous state has been combined by XOR, bit to bit, with a byte k, or Ki(j, l), of sub-key Ki, j representing the rank between 0 and 3 of the row in the array and l representing the rank between 0 and 3 of the column in the array. Operation 15 is the same as operation 11 of the first phase of the encryption, however performed with a different sub-key.

At the end of operation 15, for a round of rank i, a state Ti=M(Ki, Ti−1) is obtained. The four operations of the round transformation are repeated n−1 times, that is, after operation 15, it is returned to operation 12 to perform a new round with a next sub-key.

The third phase of the AES comprises a last round comprising operations 12, 13, and 15 of round transformation M except for the third one (MIXCOLUMNS) with, as a key for operation 15, last sub-key Kn−1.

State Tn=M'(Kn, Tn−1) is then obtained. This result may be shaped (block 16, RESULT FORM) for a subsequent use.

The order of operation 12, 13, 14, and 15 in round transformation M may vary. For example, the introduction of the sub-key (step 15) may occur before substitution operation 13.

Different countermeasures have already been provided to decrease the sensitivity of AES-type algorithmic processings to side-channel attacks and particularly to attacks by analysis of the current consumption of the circuit executing the algorithm.

Generally, such countermeasures mask the calculations by introducing random numbers at certain steps considered as sensitive. In particular, the substitution box is considered as a step sensitive to attacks due to the non-linear character of the operation that it executes. A substitution box generally corresponds to an array of 256 arrays which has to be precalculated, and then to be read from a storage memory 16 times for each round of the AES algorithm. In certain cases, a box is stored with the results of the substitution box (also called SBOX) and of column transformation MIXCOLUMNS, the stored box and the results of the two transformations being applied to a byte of each state.

To mask a substitution box, a masked substitution box which is used in the round transformation is recalculated. Masking a substitution box imposes taking into account, for the calculation thereof, the mask which will be used to unmask the encrypted result.

Figure 2:
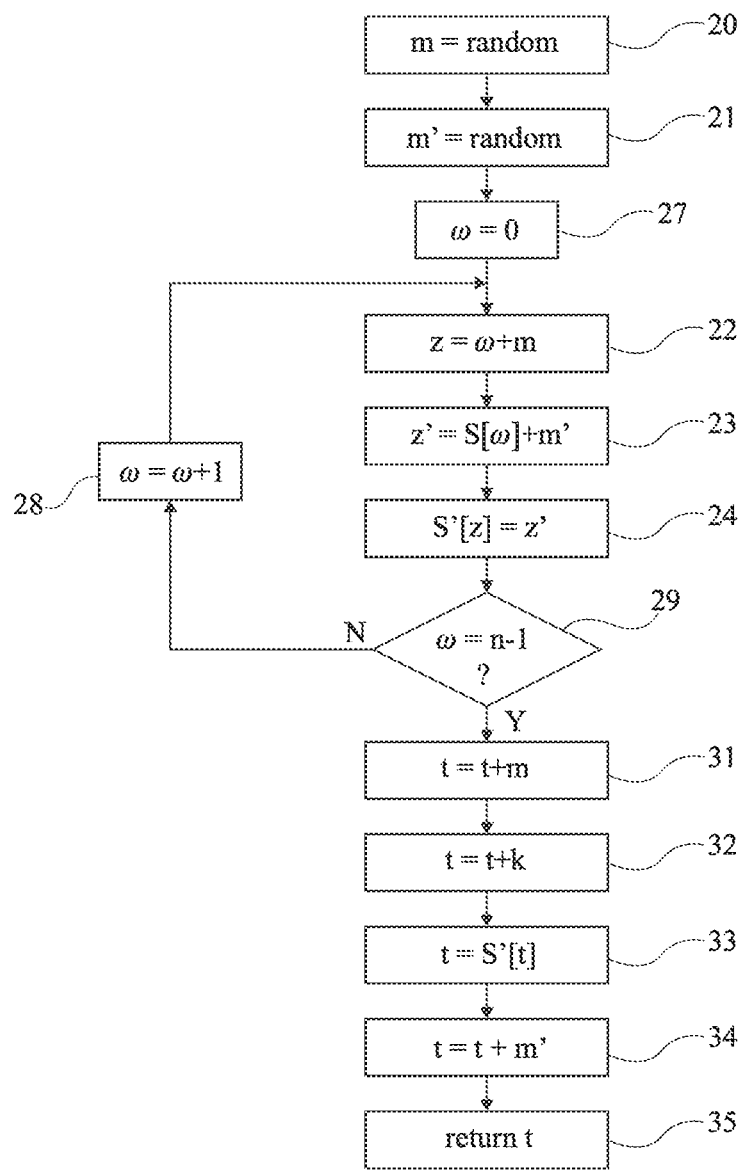
FIG. 2 schematically shows in the form of blocks an example of masking of such a substitution box of a block encryption.

FIG. 2 schematically shows in the form of blocks an example of masking of a substitution box of a block encryption.

In the example of FIG. 2, the substitution (step 13, FIG. 1) is assumed to be performed after step 15 where the round key is used. Further, step 14 (MIXCOLUMNS) is considered to be integrated in the substitution operation, that is, the substitution box performs the two operations 13 and 14. For simplification, operation 12 (SHIFTROWS) is not taken into account.

It is started (block 20, m=random), (block 21, m'=random), by defining two respective masking and unmasking masks (random numbers) m and m'. Numbers m and m' correspond to bytes.

Then, successively for each byte S[ω] of rank ω of substitution box S, a combination (block 22, z=w+m) by XOR (which is noted as a bit-to-bit addition operation +) of rank ω of the byte with mask m is performed, the result thereof being placed in a temporary variable z. Then (block 23, z'=S[ω]+m'), byte S[ω] is combined with mask m', the result thereof being placed in a temporary variable z'. Then (block 24, S'[z]=z'), the value contained in variable z' is assigned to byte S'[z] of rank z of masked substitution box S'.

For example, a counter ω is initialized to 0 (block 27, ω=0) and is incremented by 1 (block 28, ω=ω+1) for each processing of a byte of box S as long as not all bytes have been processed (output N of block 29, ω=n−1?).

Once the n bytes S[ω] of substitution box S have been processed (output Y of block 29), masked substitution box S' is used to process the message byte by byte (block by block).

Thus, each byte t of the message is combined (block 31, t=t+m) by XOR with mask m, the result thereof being placed in variable t (by overwriting byte t), and is then combined (block 32, t=t+k) by XOR with a byte k of the sub-key by overwriting byte t in variable t, and is substituted (block 33, S'[t]) by its image S'[t] in masked substitution box S'. Variable t containing image S'[t] is then unmasked (block 34, t=t+m) by being combined by XOR with mask m'. The content of variable t is then returned.

Steps 31 to 35 are repeated for all bytes t of the message.

The calculation illustrated in FIG. 2 may also be written as follows:

m←random number (block 20)
m'←random number (block 21)
For ω=0 to n−1 (block 27, output N of block 29, block 28):
  z←ω+m (block 22)
  z'←S[ω]+m' (block 23)
  S'[z]=z' (block 24)
End of loop (output Y of block 29)
t←t+m (block 31)
t←t+k (block 32)
t←S'[t] (block 33)
t←t+m' (block 34)
Return t (block 35).

DPA attacks, said to be of second order or of higher order, have made AES algorithms still more vulnerable, including when they use a random mask. DPA attacks of second order comprise isolating, in a same current trace, the signature of the mask and that of the masked data (in the example of the AES, the box). By combining the signatures and, in the case of the AES, by repeating the attack a plurality of times, the mask (the random number) can be directly or indirectly discovered.

To improve the protection of a substitution box against these types of attacks, the order in which substitution box S is recalculated may be mixed to obtain masked box S'.

For example, a random permutation φ which is used to define the order in which bytes S[ω] of the substitution box are masked by numbers m and m' is used.

Figure 3:
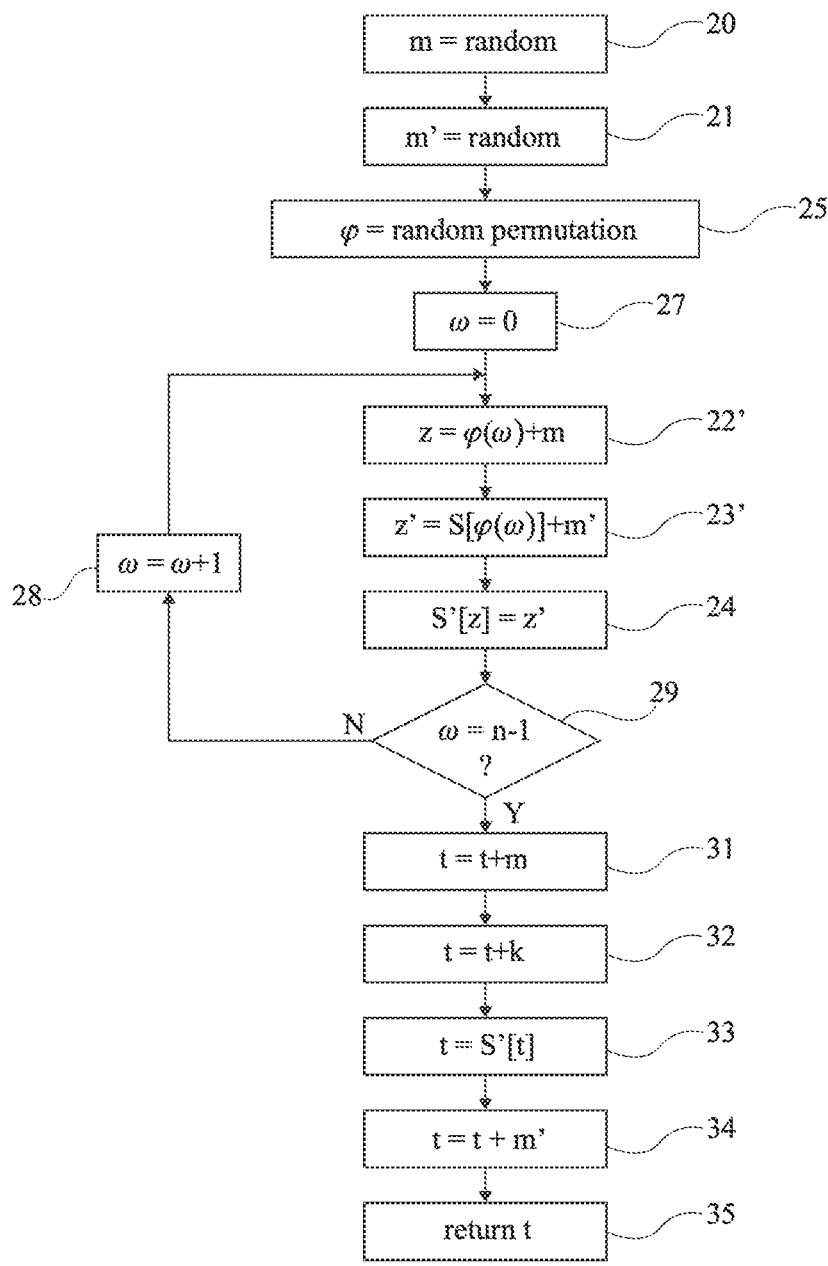
FIG. 3 schematically shows in the form of blocks an example of masking of a substitution box recalculated with a random order.

FIG. 3 schematically shows in the form of blocks an example of masking of a substitution box recalculated with a random order.

As compared with the method described in relation with FIG. 2, this amounts to selecting (block 25, φ=random permutation) a random permutation φ applicable in all n rows ω, and replacing, in steps 22 and 23, the taking into account of rank ω of the bytes of the substitution box by the taking into account of result φ(ω) of the application of permutation function φ to rank ω (block 22', z=φ(ω)+m and block 23', z'=S[φ(ω)]+m'). This amounts to modifying the order in which the bytes of the substitution box are recalculated, and thus masked. As illustrated, the other steps described in relation with FIG. 2 are not modified.

The calculation illustrated in FIG. 3 may also be written as follows:

m←random number (block 20)
m'←random number (block 21)
φ←random permutation (block 25)
For ω=0 to n−1 (block 27, output N of block 29, block 28):
  z←φ(ω)+m (block 22')
  z'←S[φ(ω)]+m' (block 23')
  S'[z]=z'(block 24)
End of loop (output Y of block 29)
t←t+m (block 31)
t←t+k (block 32)
t←S'[t] (block 33)
t←t+m' (block 34)
Return t (block 35).

The inventor has however noticed a weakness which makes this countermeasure vulnerable to a DPA attack of a still higher order.

Such a weakness originates from the actual masking of the substitution box. Indeed, the fact for random permutation φ to be unknown has the advantage that the value of rank ω in the loop (blocks 22', 23', 24) remains unknown from a possible attacker. However, twice in each loop (steps 22' and 23'), rank ω is manipulated. Accordingly, it is possible for an attacker to exploit the security "leak" linked to the two manipulations for each loop of current rank ω. In particular, the consequence of step 23' is that function φ is present all over the substitution box, that is, in practice, 256 times, which represents as many leaks. By combining the results of steps 22' and 23', the contribution of function φ is eliminated. An attack on step 32, though more complicated than in FIG. 2, becomes efficient again.

Actually, the embodiment of FIG. 3 facilitates addressing the problem of attacks of second order on the value of mask m. However, an attack of third order enables to discover the secret from the moment that the attacker is capable of identifying, in the current trace, steps 22' and 23', and thus the leak points.

In an embodiment, the resistance of an electronic circuit to an attack such as described hereabove is desired to be assessed. For this purpose, the attack is executed and it is detected whether or not it is efficient.

An embodiment facilitates improving the resistance of a Rijndael-type block encryption algorithm against side-channel attacks.

In an embodiment, the operation of step 22' (FIG. 3) does not appear in the recalculation of the box.

Figure 4:
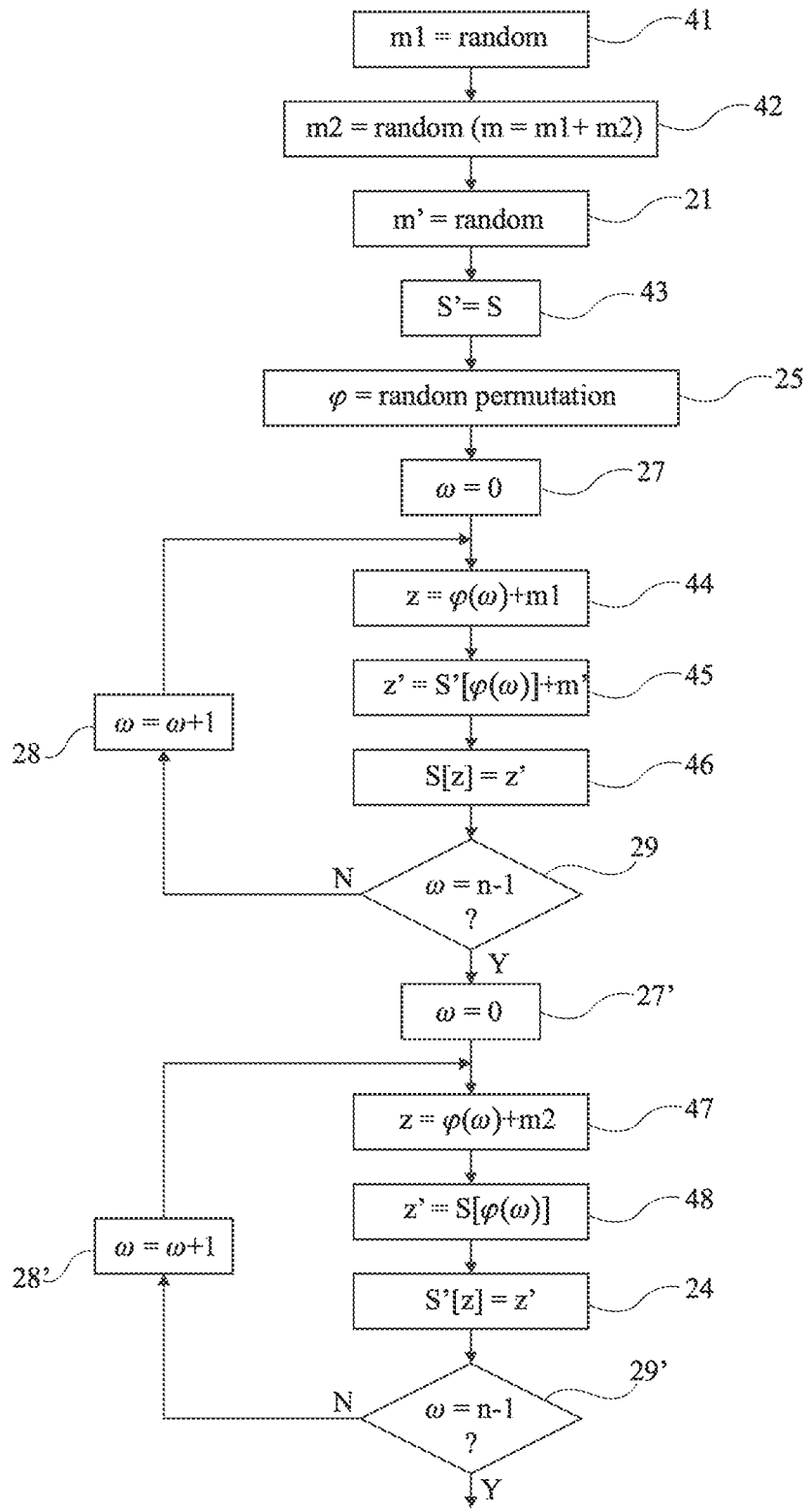
FIG. 4 schematically shows in the form of blocks an embodiment of a method of protecting the execution of an AES algorithm.

In an embodiment, random number m is divided in two and the masking of the substitution box in carried out in two steps. FIG. 4 schematically shows in the form of blocks an example embodiment.

It is started (block 41, m1=random), (block 42, m2=random, m=m1+m2), by defining two masks (random numbers) m1 and m2 such that their XOR combination corresponds to a random number m (the number which will be used at step 31). As previously, random unmasking value m' (block 21, m'=random) and a random permutation (block 25, φ=random permutation) applicable in all n ranks ω are then defined. Masks m1, m2, m, and m' correspond to bytes. A masked substitution box S' is also initialized with the values of unmasked substitution box S (block 43, S'=S). The order of steps 21 and 43 (or 43 and 21) with respect to steps 41 and 42 is of no importance.

Then, the recalculation of the substitution box is divided in two loops, a first time using random number m1 on box S', a second time using random number m2 on box S originating from the first loop.

Thus, successively, for each byte S'[ω] of rank ω of substitution box S', permutation function φ is applied to rank ω and a XOR combination (block 44, z=φ(w)+m1) of result φ(ω) with mask m1 is performed, the result thereof being placed in a temporary variable z. Then (block 45, z'=S'[φ(ω)]+m'), byte S'[φ(ω)] is combined with mask m', the result thereof being placed in a temporary variable z'. Then (block 46, S[z]=z'), the value contained in variable z' is assigned to byte S[z] of rank z of unmasked substitution box S.

For example, a counter ω is initialized to 0 (block 27, ω=0) and is incremented by 1 (block 28, ω=ω+1) for each processing of a byte of box S' as long as not all bytes have been processed (output N of block 29, ω=n−1?).

Once the n bytes S'[ω] of substitution box S' initialized at 43 have been processed (output Y of block 29) with portion m1 of number m, the bytes of substitution box S resulting from the first loop are recovered to be masked with portion m2.

Thus, successively, for each byte S[ω] of rank ω of substitution box S, permutation function φ is applied to rank ω and a XOR combination (block 47, z=φ(ω)+m2) of result φ(ω) with mask m2 is performed, the result thereof being placed in variable z. Then (block 48, z'=S[φ(ω)]), byte S[φ(ω)] of substitution box S resulting from the first loop is placed in variable z'. Then (block 24, S'[z]=z'), the value contained in variable z' is assigned to byte S'[z] of rank z of masked substitution box S'.

For example, for the loop calculation, a counter ω is initialized to 0 again (block 27, ω=0) and is incremented by 1 (block 28, ω=ω+1) for each processing of a byte of box S originating from the first loop as long as not all bytes have been processed (output N of block 29', ω=n−1?).

Once the n bytes S[φ(ω)] of substitution box S originating from the first loop have been processed with portion m2 of number m (output Y of block 29'), resulting masked substitution box S' is used to process the message byte by byte (block by block) and execute steps 31 to 35 as described in FIGS. 2 and 3.

The calculation illustrated in FIG. 4 may also be written as follows:

m1←random number (block 41)
m2←random number (block 42)
m'←random number (block 21)
S'←S (block 43)
φ←random permutation (block 25)
For ω=0 to n−1 (block 27, output N of block 29, block 28):
z←φ(ω)+m1 (block 44)
z'←S'[φ(ω)]+m' (block 45)
S[z]=z'(block 46)
End of loop (output Y of block 29)
For ω=0 to n−1 (block 27', output N of block 29', block 28'):
z←φ(ω)+m2 (block 47)
z'←S[φ(ω)] (block 48)
S'[z]=z'(block 24)
End of loop (output Y of block 29')
t←t+m (block 31, FIG. 3)
t←t+k (block 32, FIG. 3)
t←S'[t] (block 33, FIG. 3)
t←t+m' (block 34, FIG. 3)
Return t (block 35, FIG. 3).

Figure 5:
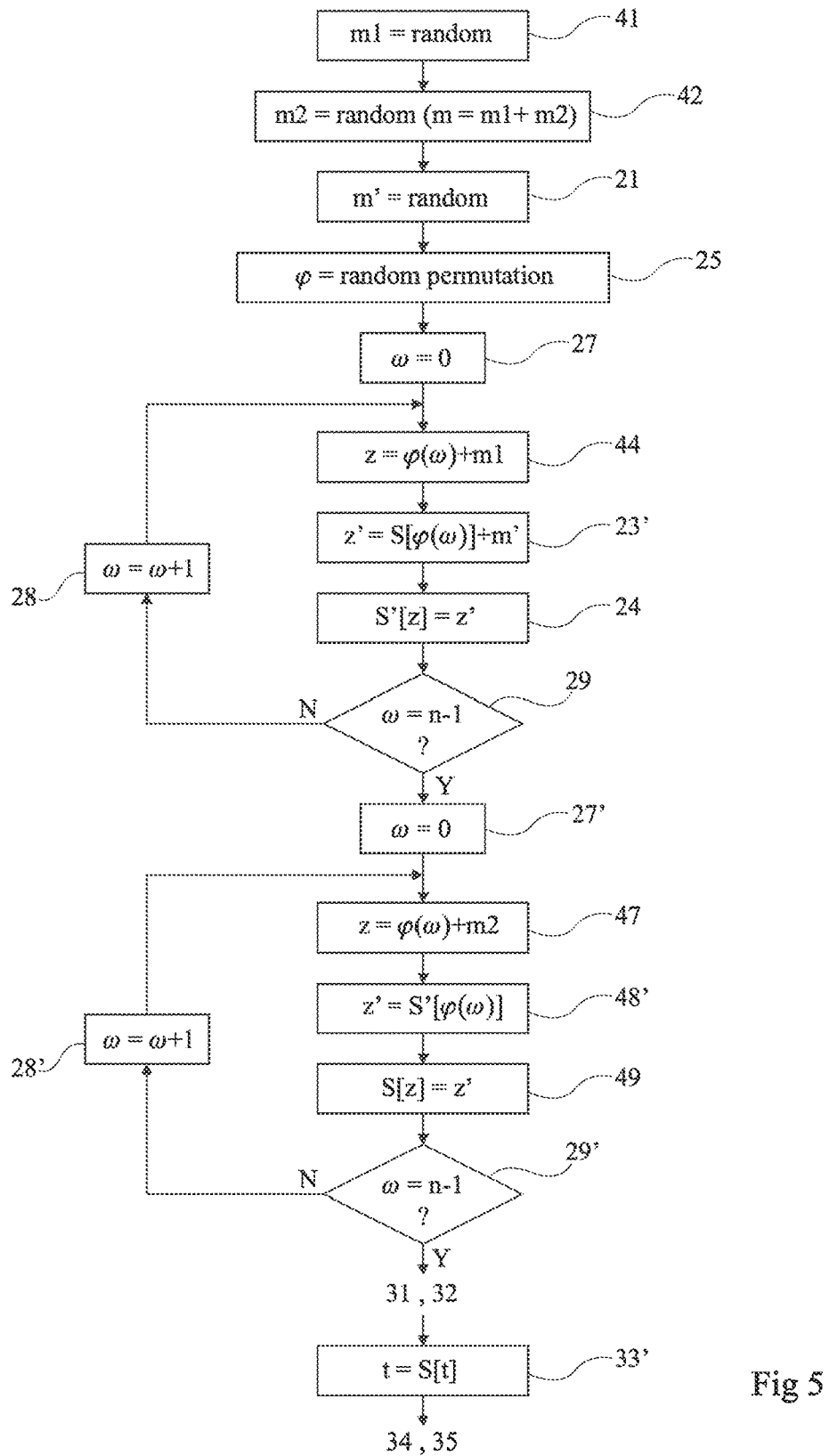
FIG. 5 schematically shows in the form of blocks another embodiment of a method of protecting the execution of an AES algorithm.

FIG. 5 schematically shows in the form of blocks an embodiment of an electronic system.

It is started (block 41, m1=random), (block 42, m2=random, m=m1+m2), by defining two masks (random numbers) m1 and m2 such that their XOR combination corresponds to a random number m (the number which will be used at step 31). As previously, random unmasking value m' (block 21, m'=random) and a random permutation (block 25, φ=random permutation) applicable in all n ranks ω are defined. Masks m1, m2, m, and m' correspond to bytes. The order of steps 21 and 43 (or 43 and 21) with respect to steps 41 and 42 is of no importance.

The recalculation of the substitution box is divided in two loops, a first time using random number m1 on box S, a second time using random number m2 on box S' originating from the first loop.

Thus, successively, for each byte S[ω] of rank ω of substitution box S', permutation function φ is applied to rank ω and a XOR combination (block 44, z=φ(ω)+m1) of result φ(ω) with mask m1 is performed, the result thereof being placed in a temporary variable z. Then (block 23', z'=S[φ(ω)]+m'), byte S'[φ(ω)] is combined with mask m', the result thereof being placed in a temporary variable z'. Then (block 24, S'[z]=z'), the value contained in variable z' is assigned to byte S'[z] of rank z of masked substitution box S'.

For example, a counter ω is initialized to 0 (block 27, ω=0) and is incremented by 1 (block 28, ω=ω+1) for each processing of a byte of box S as long as not all bytes have been processed (output N of block 29, ω=n−1?).

Once the n bytes S[ω] of substitution box S have been processed (output Y of block 29) with portion m1 of number m, the bytes of substitution box S' resulting from the first loop are recovered to be masked with portion m2.

Thus, successively, for each byte S'[ω] of rank ω of substitution box S', permutation function φ is applied to rank ω and a XOR combination (block 47, z=φ(ω)+m2) of result φ(ω) with mask m2 is performed, the result thereof being placed in variable z. Then (block 48, z'=S'[φ(ω)]), byte S'[(φ(ω)] of substitution box S' resulting from the first loop is then placed in variable z'. Then (block 49, S[z]=z'), the value contained in variable z' is assigned to byte S[z] of rank z of substitution box S.

For example, for the loop calculation, a counter ω is initialized to 0 again (block 27', ω=0) and is incremented by 1 (block 28', ω=ω+1) for each processing of a byte of box S' originating from the first loop as long as not all bytes have been processed (output N of block 29', ω=n−1?).

Once (output Y of block 29') the n bytes S[φ(ω)] of substitution box S' originating from the first loop have been processed with portion m2 of number m, the resulting substitution box S, which here forms the masked substitution box, is used to process the message byte by byte (block by block). Thus, step 33 described in relation with FIGS. 2 and 3 takes the bytes of box S and not those of box S' (block 33', t=S[t]). As illustrated, steps 31, 32, 34, and 35 are not modified with respect to the embodiment of FIGS. 2 and 3.

As compared with the embodiment of FIG. 4, the initialization of box S' is spared (block 43, FIG. 4).

The calculation illustrated in FIG. 5 may also be written as follows:
m1←random number (block 41)
m2←random number (block 42)
m'←random number (block 21)
φ←random permutation (block 25)
For ω=0 to n−1 (block 27, output N of block 29, block 28):
z←φ(ω)+m1 (block 44)
z'←S[φ(ω)]+m' (block 23')
S'[z]z'(block 24)
End of loop (output Y of block 29)
For ω=0 to n−1 (block 27', output N of block 29', block 28'):
z←φ(ω)+m2 (block 47)
z'←S'[φ(ω)] (block 48')
S[z]=z' (block 49)
End of loop (output Y of block 29')
t←t+m (block 31, FIG. 3)
t←t+k (block 32, FIG. 3)
t←S[t] (block 33')
t←t+m' (block 34, FIG. 3)
Return t (block 35, FIG. 3).

The fact of dividing mask m into two portions m1 and m2 and to execute the calculation of the substitution box twice makes the attack more difficult.

Figure 6:
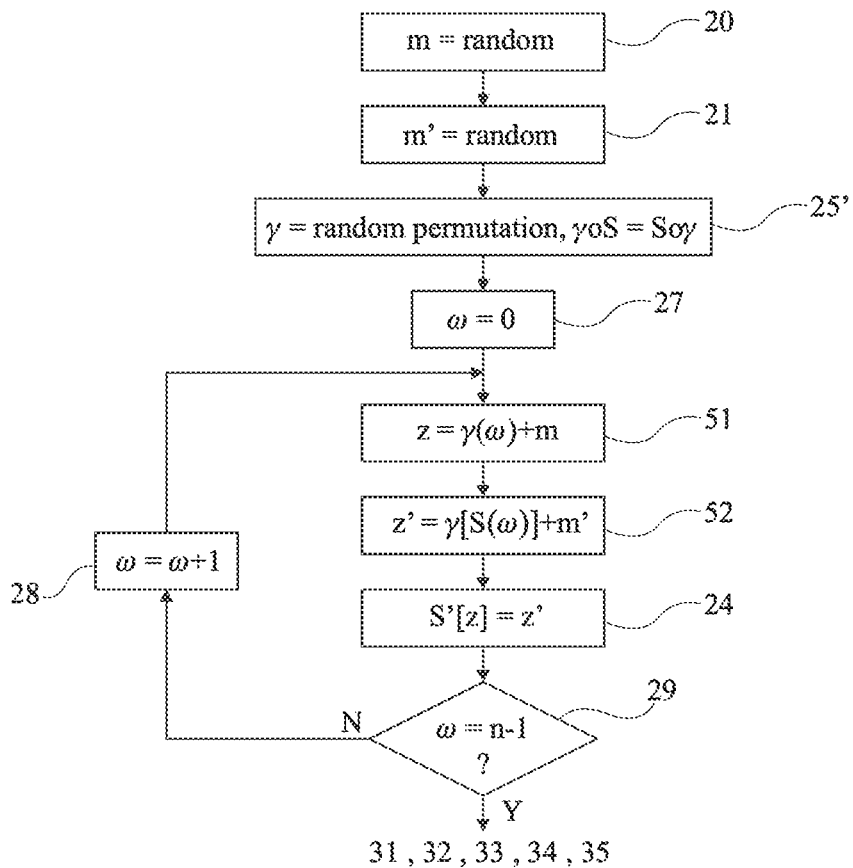
FIG. 6 schematically shows in the form of blocks another embodiment of a method of protecting the execution of an AES algorithm.

In an embodiment, during the recalculation of the substitution box, a function is employed of commutative permutation with the substitution operation. FIG. 6 schematically shows in the form of blocks an embodiment.

It is started (block 20, m=random), (block 21, m'=random), as in FIG. 2, by defining two respective masking and unmasking masks (random numbers) m and m'.

Then (block 25', γ=random permutation, γoS=Soγ), a random permutation commutative with the substitution box is selected.

Then, successively, for each byte S'[ω] of rank ω of substitution box S, permutation function γ is applied to rank ω and a XOR combination (block 51, z=γ(ω)+m) of result γ(ω) with mask m is performed, the result thereof being placed in a temporary variable z. Then (block 52, z'=γ(S [ω]+m'), the result of the application of function γ to byte S[(ω)] is combined with mask m', the result thereof being placed in a temporary variable z'. Then (block 24, S'[z]=z'), the value contained in variable z' is assigned to byte S'[z] of rank z of masked substitution box S'. As in the previous embodiments, a counter ω is for example initialized at 0 (block 27, ω=0) and is incremented by 1 (block 28, ω=ω+1) for each processing of a byte S[ω] of box S as long as not all bytes have been processed (output N of block 29, ω=n−1?).

Once the n bytes S[ω] of substitution box S have been processed (output Y of block 29), the resulting masked substitution box S' is used to process the message byte by byte (block by block) and to execute steps 31 to 35 as described in FIGS. 2 and 3.

As compared with FIG. 3, value γ(ω) only appears once per loop. It is thus not possible to combine it within the loop to exploit a current trace. However, since function γ is commutative with substitution operation S, the result of step 52 is the same as that of step 23' of FIG. 3, which allows the unmasking.

The calculation illustrated in FIG. 6 may also be written as follows:
m←random number (block 20)
m'←random number (block 21)
γ←random permutation commutative with substitution operation S (block 25')
For ω=0 to n−1 (block 27, output N of block 29, block 28):
z←γ(ω)+m (block 51)
z'←γ(S[ω])+m' (block 52)
S'[z]z'(block 24)
End of loop (output Y of block 29)
t←t+m (block 31)
t←t+k (block 32)
t←S'[t] (block 33)
t←t+m' (block 34)
Return t (block 35).

In an embodiment, the raising to any power, which may be random, of the substitution box, may be used as a function γ commutative with the substitution operation.

The implementation of an embodiment of the method of verifying the sensitivity to the attack facilitates verifying whether an embodiment of one of the countermeasures described in relation with FIGS. 4 to 6 is implemented or not by the electronic circuit.

In practice, the different values, bytes, variables, etc. are physically stored into registers of one or a plurality of electronic circuits and the content of these registers may be read and/or written according to control signals depending on the method steps. The electronic circuit is for example a processor for executing the described algorithm having input, output registers, and configured to manipulate the different values. The calculation and substitution steps are for example carried out by elements in wired logic integrated to the processor.

Figure 7:
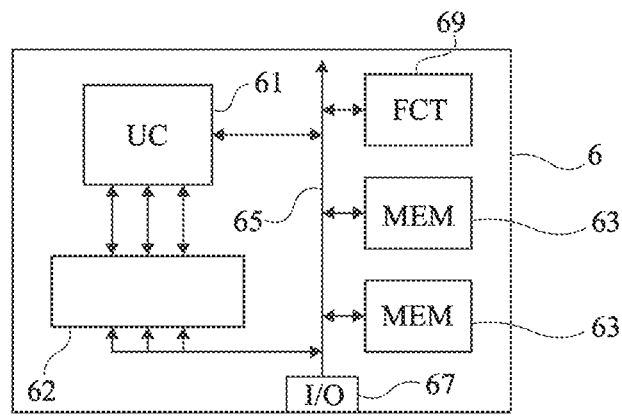
FIG. 7 shows an example of an electronic circuit to implement the described methods.

FIG. 7 very schematically shows an example of an electronic circuit 6 of the type to which the embodiments which will be described apply.

Circuit 6 comprises:
a calculation unit 61 (UC), for example, a state machine, a microprocessor, a programmable logic circuit, etc. comprising or using registers 62, containing different variables used for the calculation and arbitrarily shown in FIG. 7 outside of unit 61;
one or a plurality of volatile and/or non-volatile storage areas 63 (MEM) for storing all or part of the data and keys;
one or a plurality of data, address, and/or control buses 65 between the different elements internal to circuit 6 and an input-output interface 67 (I/O) for communicating with the outside of circuit 6.

Circuit 6 may include various other circuits according to the application, symbolized in FIG. 7 by a block 69 (FCT). For example, block 69 may comprise circuitry (e.g., a controller, etc.) configured to subject the calculation circuit 61 to a side-channel attack. Block 69 may be external to the circuit 6.

Some embodiments may take the form of or comprise computer program products. For example, according to one embodiment there is provided a computer readable medium comprising a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

Various embodiments have been described. Various alterations and modifications will occur to those skilled in the art. In particular, the integration of the above-described steps in the round processings of the AES algorithm is within the abilities of those skilled in the art based on the above description. Finally, the practical implementation of the embodiments which have been described is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    protecting an electronic circuit against side channel attacks during processing of data by the electronic circuit, by:
    masking, by the electronic circuit, each block of data to be processed with a first mask;
    applying, by the electronic circuit, a non-linear block substitution operation based on a first substitution box to the masked data; and
    unmasking, by the electronic circuit, a result of the application of the non-linear block substitution operation with a second mask, wherein, before applying the non-linear substitution operation, the first substitution box is recalculated, block by block, with an order of processing of blocks of the first substitution box is randomly permutated, and the recalculation of the first substitution box uses the second mask as well as third and fourth masks, with a combination of the third and fourth masks being equal to the first mask.

2. The method of claim 1, comprising:
    successively for each block in the first substitution box:
        submitting a rank of a current block to said permutation and combining a result of the permutation of the rank of the current block with the third mask; and
        replacing the current block of a second box with a combination of the second mask with a block of the first box identified by the result of the permutation of the rank of the current block; and
    successively for each block in the second substitution box:
        submitting a rank of a current block to said permutation and combining a result of the permutation of the rank of the current block with the fourth mask; and
        replacing the current block of the first substitution box with a block of the second box identified by the result of the permutation of the rank of the current block.

3. The method of claim 2, wherein the first box is the recalculated substitution box.

4. The method of claim 1, comprising:
    successively for each block in the first box:
        in a first step, applying the permutation to a rank of a current block, combining a result of the permutation of the rank of the current block with the first mask, and storing a result of the combination in a first variable;
        in a second step, storing in a second variable a result of a combination of the second mask with a block of the first box having a rank of the result of the permutation applied to the rank of the current block; and
        storing the second variable in a block of a second box having a rank of the first variable; and
    successively for each block in the second box:
        in a third step, applying the permutation to a rank of a current block, combining a result of the permutation of the rank of the current block with the second mask, and storing a result of the combination in the first variable;
        in a fourth step, storing in the second variable the block of the second box having a rank of the result of the permutation applied to the rank of the current block; and
        storing the second variable in a block of the first box having a rank of the first variable.

5. The method of claim 1, comprising:
    copying the blocks of the first box into a second box;
    successively for each block in the second box:
        submitting a rank of a current block to said permutation and combining a result of the permutation of the rank with the third mask; and
        replacing the current block of the first box with a combination of the second mask and a block of the second box identified by the result of the permutation of the rank; and
    successively for each block in the first box:
        submitting a rank of a current block to said permutation and combining a result of the permutation of the rank with the fourth mask; and
        replacing the current block of the second box with a block of the first box having a rank of the result of the permutation of the rank of the current block.

6. The method of claim 5 wherein the second box is the recalculated substitution box.

7. The method of claim 1, comprising:
copying the blocks of the first box into a second box;
successively for each block in the second box:
  in a first step, applying the permutation to a rank of a current block, combining a result of the permutation of the rank with the first mask, and storing the combination in a first variable;
  in a second step, storing in a second variable a result of a combination of the second mask with a block of the second box having a rank of the result of the permutation of the rank of the current block; and
  storing the second variable in a block of the first box having a rank of the first variable; and
successively for each block in the first box:
  in a third step, applying the permutation to a rank of a current block, combining a result of the permutation of the rank with the second mask, and storing the combination in the first variable;
  in a fourth step, storing in the second variable a block of the first box having a rank of the result of the permutation of the current rank; and
  storing the second variable in a block of the second box having a rank of the first variable.

8. The method of claim 1 wherein the masks are random numbers.

9. The method of claim 1 wherein the masks have a same size as a block.

10. The method of claim 1 wherein the combinations are of XOR type.

11. The method of claim 1 wherein the processing comprises applying an Advanced Encryption Standard (AES) algorithm.

12. The method of claim 1 wherein the processing comprises applying a Rijndael-type algorithm to the data.

13. An apparatus, comprising:
one or more registers; and
circuitry coupled to the one or more registers, the circuitry, in operation, protecting the apparatus against side channel attacks during processing of data by the apparatus, by:
  masking each block of data to be processed with a first mask;
  applying a non-linear block substitution operation based on a first substitution box to the masked data; and
  unmasking a result of the application of the non-linear block substitution operation with a second mask, wherein, before applying the non-linear substitution operation, the first substitution box is recalculated, block by block, with an order of processing of blocks of the substitution box is-randomly permutated, and the recalculation of the first substitution box uses the second mask as well as third and fourth masks, with a combination of the third and fourth masks being equal to the first mask.

14. The apparatus of claim 13 wherein the protecting apparatus against side channel attacks includes:
successively for each block in the first substitution box:
  submitting a rank of a current block to said permutation and combining a result of the permutation of the rank of the current block with the third mask; and
  replacing the current block of a second box with a combination of the second mask with a block of the first box identified by the result of the permutation of the rank of the current block; and
successively for each block in the second substitution box:
  submitting the rank of a current block to said permutation and combining a result of the permutation of the rank of the current block with the fourth mask; and
  replacing the current block of the first box with a block of the second box identified by a result of the permutation of the rank of the current block.

15. The apparatus of claim 14 wherein the recalculated substitution box is the first box.

16. The apparatus of claim 13 wherein the protecting the apparatus from side channel attacks includes:
successively for each block in the first box:
  applying the permutation to a rank of a current block, combining a result of the permutation of the rank of the current block with the first mask, and storing a result of the combination in the one or more registers as a value of a first variable;
  storing a result of a combination of the second mask with a block of the first box having a rank of the result of the permutation applied to the rank of the current block in the one or more registers as a value of a second variable; and
  storing the value of the second variable in a block of a second box having a rank of the value of the first variable; and
successively for each block in the second box:
  applying the permutation to a rank of a current block, combining a result of the permutation of the rank of the current block with the second mask, and storing a result of the combination in the one or more registers as the value of the first variable;
  storing the block of the second box having a rank of the result of the permutation applied to the rank of the current block in the one or more registers as the value of the second variable; and
  storing the value of the second variable in a block of the first box having a rank of the value of the first variable.

17. The apparatus of claim 13 wherein the protecting the apparatus from side channel attacks includes:
copying the blocks of the first box into a second box;
successively for each block in the second box:
  submitting a rank of a current block to said permutation and combining a result of the permutation of the tank with the third mask; and
  replacing the current block of the first box with a combination of the second mask and a block of the second box identified by the result of the permutation of the rank; and
successively for each block in the first box:
  submitting a rank of a current block to said permutation and combining a result of the permutation of the rank with the fourth mask; and
  replacing the current block of the second box with a block of the first box having a rank of the result of the permutation of the rank of the current block.

18. The apparatus of claim 17 wherein the second box is the recalculated substitution box.

19. The apparatus of claim 13 wherein the protecting the apparatus from side channel attacks includes:
copying the blocks of the first box into a second box;
successively for each block in the second box:
  applying the permutation to a rank of a current block, combining a result of the permutation of the rank with the first mask, and storing the combination in the one or more registers as a value of a first variable;

storing a result of a combination of the second mask with a block of the second box having a rank of the result of the permutation of the rank of the current block in the one or more registers as a value of a second variable; and storing the value of the second variable in a block of the first box having a rank of a value of the first variable; and successively for each block in the first box:

applying the permutation to a rank of a current block, combining a result of the permutation of the rank with the second mask, and storing the combination in the one or more registers as the value of the first variable;

storing a block of the first box having a rank of the result of the permutation of the current rank in the one or more registers as the value of the second variable; and storing the value of the second variable in a block of the second box having a rank of the value of the first variable.

20. The apparatus of claim 13 wherein the masks are random numbers having a same size as a block and the combinations are of an XOR type.

21. The apparatus of claim 13, comprising an integrated circuit including the circuitry and the one or more registers.

22. A system, comprising:

a bus system; and circuitry, coupled to the bus system, the circuitry, in operation, protecting against side channel attacks by:

masking each block of data to be processed with a first mask;

applying a non-linear block substitution operation based on a first substitution box to the masked data; and unmasking a result of the application of the non-linear block substitution operation with a second mask, wherein, before applying the non-linear substitution operation, the first substitution box is recalculated, block by block, with an order of processing of blocks of the substitution box is-randomly permutated, and the recalculation of the first substitution box is based on the second mask, a third and a fourth masks, with a combination of the third and fourth masks being equal to the first mask.

23. The system of claim 22, comprising an integrated circuit including the circuitry.

24. The system of claim 23 wherein the integrated circuit comprises a plurality of registers and the protecting against side channel attacks includes storing variables in the plurality of registers.

* * * * *